(12) United States Patent
Powell

(10) Patent No.: US 10,287,952 B2
(45) Date of Patent: May 14, 2019

(54) EMISSIONS CONTROL SUBSTRATE

(71) Applicant: DENSO International America, Inc., Southfield, MI (US)

(72) Inventor: Patrick Powell, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 258 days.

(21) Appl. No.: 15/085,326

(22) Filed: Mar. 30, 2016

(65) Prior Publication Data

US 2017/0284263 A1 Oct. 5, 2017

(51) Int. Cl.
*F01N 3/023* (2006.01)
*F01N 3/28* (2006.01)
*F01N 3/021* (2006.01)
*B01D 53/94* (2006.01)

(52) U.S. Cl.
CPC ......... *F01N 3/2807* (2013.01); *B01D 53/944* (2013.01); *F01N 3/021* (2013.01); *F01N 3/0234* (2013.01); *B01D 2251/2067* (2013.01); *B01D 2255/1021* (2013.01); *B01D 2255/1023* (2013.01); *B01D 2255/1025* (2013.01); *B01D 2255/2065* (2013.01); *B01D 2255/2073* (2013.01); *B01D 2255/20738* (2013.01); *B01D 2255/20753* (2013.01); *B01D 2255/20761* (2013.01); *B01D 2257/404* (2013.01)

(58) Field of Classification Search
CPC .... F01N 3/2892; F01N 3/2066; F01N 3/0222; F01N 2330/04; F01N 13/2814; F01N 2330/02; F01N 3/035

USPC ...... 422/171, 177, 180; 60/274, 303; 50/523
See application file for complete search history.

(56) References Cited

U.S. PATENT DOCUMENTS

| | | | |
|---|---|---|---|
| 5,221,484 A * | 6/1993 | Goldsmith | B01D 39/2075 210/321.75 |
| 5,258,164 A * | 11/1993 | Bloom | F01N 3/0211 422/171 |
| 5,594,652 A | 1/1997 | Penn et al. | |
| 5,693,295 A * | 12/1997 | Foster | B01J 35/04 422/171 |
| 5,730,869 A | 3/1998 | Koppe | |
| 6,013,118 A | 1/2000 | Matsunuma et al. | |
| 7,611,560 B2 | 11/2009 | Ichikawa | |
| 8,444,752 B2 | 5/2013 | Beall et al. | |
| 8,500,840 B2 | 8/2013 | Okazaki et al. | |
| 8,590,158 B2 | 11/2013 | Gallagher et al. | |
| 8,653,543 B2 | 2/2014 | Yokoyama et al. | |
| 2005/0042151 A1* | 2/2005 | Alward | B01D 39/2082 422/177 |
| 2005/0252631 A1 | 11/2005 | Bardes et al. | |
| 2006/0057046 A1* | 3/2006 | Punke | B01D 53/944 423/215.5 |
| 2007/0122318 A1* | 5/2007 | Habeger | F01N 3/2814 422/177 |

(Continued)

*Primary Examiner* — Tom P Duong
(74) *Attorney, Agent, or Firm* — Harness, Dickey & Pierce, P.L.C.

(57) ABSTRACT

An emissions control substrate. The emissions control substrate includes a first end and a second end opposite to the first end. A plurality of channels extend between the first end and the second end, and are configured to direct exhaust from an engine through the substrate. The emissions control substrate is three-dimensionally printed.

16 Claims, 4 Drawing Sheets

(56) References Cited

U.S. PATENT DOCUMENTS

| | | | |
|---|---|---|---|
| 2009/0183501 A1* | 7/2009 | Gonze | F01N 3/0222 |
| | | | 60/303 |
| 2010/0071346 A1* | 3/2010 | Klingberg | B01F 3/04049 |
| | | | 60/274 |
| 2012/0308837 A1 | 12/2012 | Schlechtriemen et al. | |
| 2014/0007563 A1* | 1/2014 | Szczepanski | F01N 3/2825 |
| | | | 60/299 |

* cited by examiner

EMISSIONS CONTROL SUBSTRATE

FIELD

The present disclosure relates to an emissions control substrate, such as a three-dimensionally printed emissions control substrate.

BACKGROUND

This section provides background information related to the present disclosure, which is not necessarily prior art.

Emissions control substrates are often used with engine exhaust systems to treat the exhaust before it is released into the atmosphere. For example, a catalytic converter substrate is often used with automobile exhaust systems to catalyze a redox reaction, thereby converting CO into $CO_2$, and converting $NO_x$ into $N_2$ and $O_2$. A particulate filter substrate is often used to treat exhaust gas from a diesel engine by filtering particulate matter out of the exhaust. While existing emissions control substrates are suitable for their intended use, they are subject to improvement. The present teachings provide for emissions control substrates that address various needs in the art, and provide numerous unexpected and advantageous results.

SUMMARY

This section provides a general summary of the disclosure, and is not a comprehensive disclosure of its full scope or all of its features.

The present teachings provide for an emissions control substrate. The emissions control substrate includes a first end and a second end opposite to the first end. A plurality of channels extend between the first end and the second end, and are configured to direct exhaust from an engine through the substrate. The emissions control substrate is three-dimensionally printed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
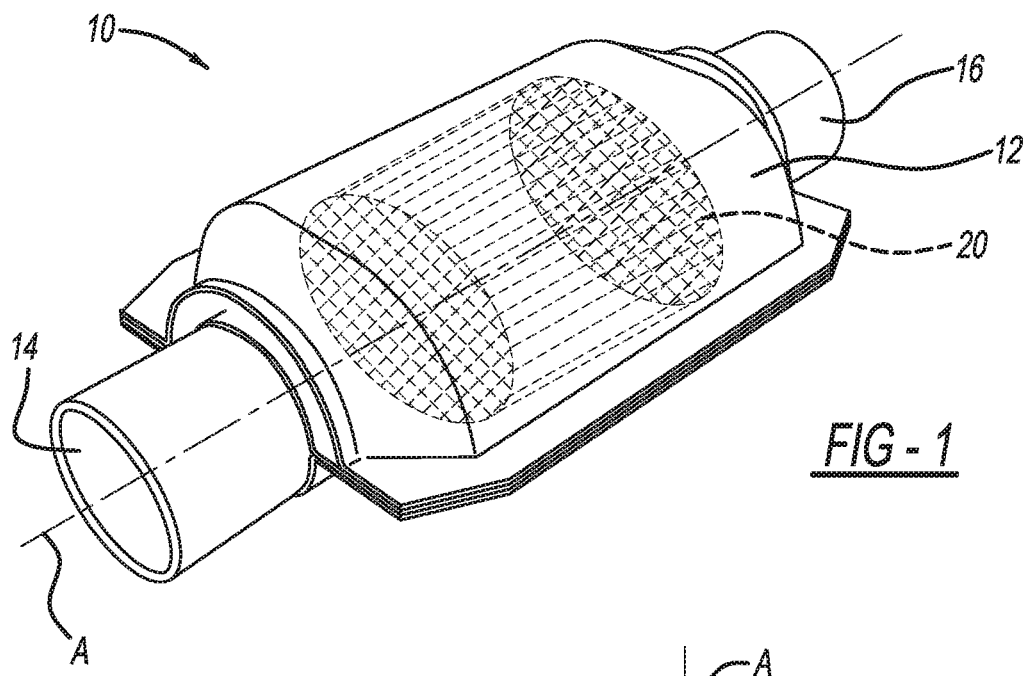
FIG. 1 is a perspective view of an emissions control device according to the present teachings.

With initial reference to FIG. 1, an emissions control device according to the present teachings is illustrated at reference numeral 10. The emissions control device includes an exhaust chamber or shell 12 having an inlet 14 and an outlet 16 on opposite sides thereof. Within the exhaust chamber 12 is an emissions control substrate 20, which can be configured as a catalytic converter and/or a particulate filter, depending on the application. The emissions control device 10 is configured to be coupled to an exhaust system of an engine, such as any suitable internal combustion engine, including a vehicle engine, generator, building system, etc. With respect to vehicles, the emissions control device 10 can be used with any suitable vehicle including passenger vehicles, sport utility vehicles, recreational vehicles, military vehicles, mass transit vehicles, locomotives, watercraft, aircraft, etc.

The emissions control device 10, and particularly the substrate 20 thereof, can be formed in any suitable manner, such as with any suitable three-dimensional manufacturing or printing process (also known as additive manufacturing) using any suitable three-dimensional manufacturing device. Any suitable type of three-dimensional manufacturing can be used, such as, but not limited to, the following, which are generally referred to herein as three-dimensional printing: fused deposition modeling; fused filament fabrication; robocasting; stereo lithography; digital light processing; powder bed three-dimensional printing; inkjet head three-dimensional printing; electron-beam melting; selective laser melting; selective heat sintering; selective laser sintering; direct metal laser sintering; laminated object manufacturing; and electron beam freeform fabrication. Any of the substrates 20 described herein can be manufactured using three-dimensional printing, or any other suitable manufacturing process. The substrates 20 can be manufactured apart from, or together with, the exhaust chamber 12. When manufactured together, three-dimensional printing can be used to manufacture the entire emissions control device 10 with the substrate 20 within the chamber 12, thereby simplifying manufacturing, assembly, and installation of the emissions control device 10, and typically reducing the overall cost of the emissions control device 10.

Figure 2:
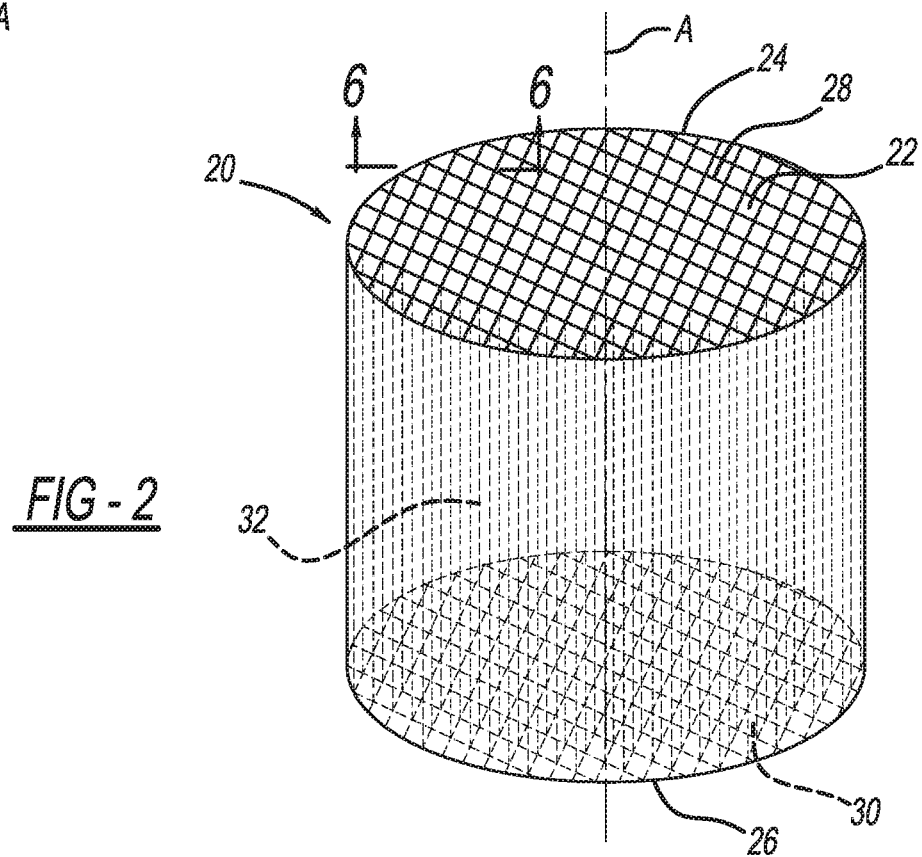
FIG. 2 is a perspective view of an emissions control substrate according to the present teachings.

With additional reference to FIG. 2, the substrate 20 defines a plurality of channels or cells 22, which are adjacent to one another and extend between a first end 24 and a second end 26 of the substrate 20. Each one of the channels 22 includes a first opening 28 at the first end 24 of the substrate 20, and a second opening 30 at the second end 26 of the substrate 20. A body 32 of each one of the channels 22 extends from the first opening 28 to the second opening 30. The substrate 20 is arranged in the chamber 12 such that exhaust entering the emissions control device 10 through the inlet 14 enters the channels 22 through the first openings 28 of the channels 22. Exhaust passes through the channels 22 and is treated, as described further herein, and exits the channels 22 through the second openings 30. From the second openings 30 exhaust flows out of the emissions control device 10 through the outlet 16.

Figure 3A:
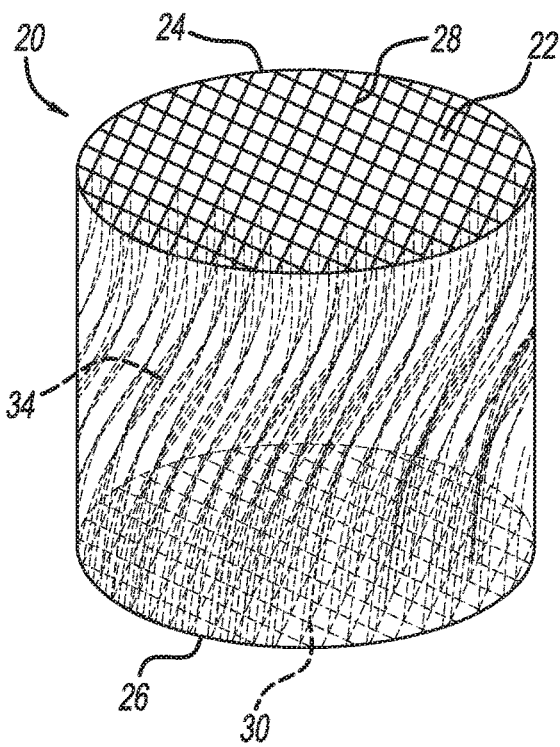
FIG. 3A is a perspective view of another emissions control substrate according to the present teachings.
Figure 3B:
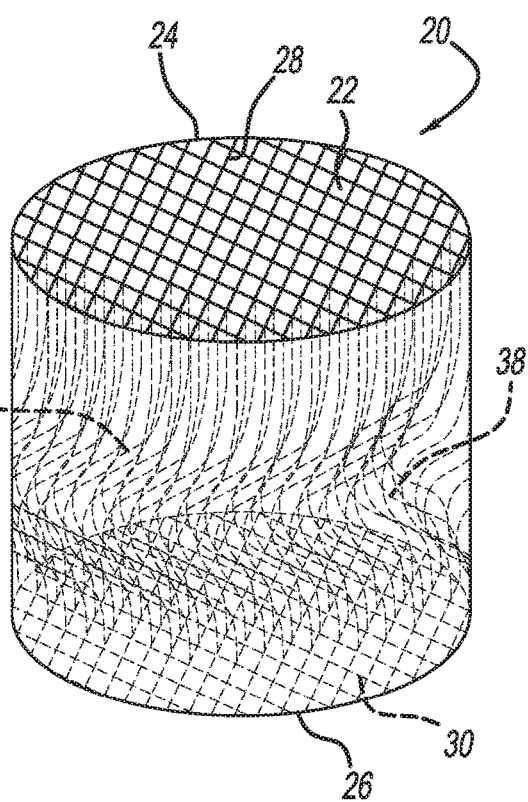
FIG. 3B is a perspective view of an additional emissions control substrate according to the present teachings.

In the example of FIG. 2, the channels 22 extend generally linearly from the first end 24 to the second end 26 of the substrate 20, such that the bodies 32 of the channels 22 extend parallel to a longitudinal axis A of the substrate 20 extending from the first end 24 to the second end 26. Alternatively and with reference to FIG. 3A, the channels 22 can each be configured with a body 34, which does not extend parallel to the longitudinal axis A, but is rather continuously curved along its length from the first end 24 to the second end 26. For example, the bodies 34 can curve or twist in a generally clockwise or counterclockwise direction along the lengths thereof as the bodies 34 extend from the first end 24 to the second end 26 of the body 32. With reference to FIG. 3B, as another alternative the channels 22 can include a body 36 with an offset portion 38 along the lengths thereof. The offset portion 38 is generally halfway between the first opening 28 and the second opening 30 along the lengths of each of the channels 22. The offset portion 38 is curved and generally laterally offset from portions of the body 36 that are proximate to the first end 24 and the second end 26. The continuously curved body portions 34 and the body portions 36 with the offset portions 38 provide numerous advantages, such as facilitating interaction of exhaust with catalyst(s) present on sidewalls of the channels 22 and/or facilitating flow of exhaust through exhaust permeable sidewalls 60 (see FIG. 6 for example) of the channels to filter particulate matter from the exhaust, as described herein.

Figure 4:
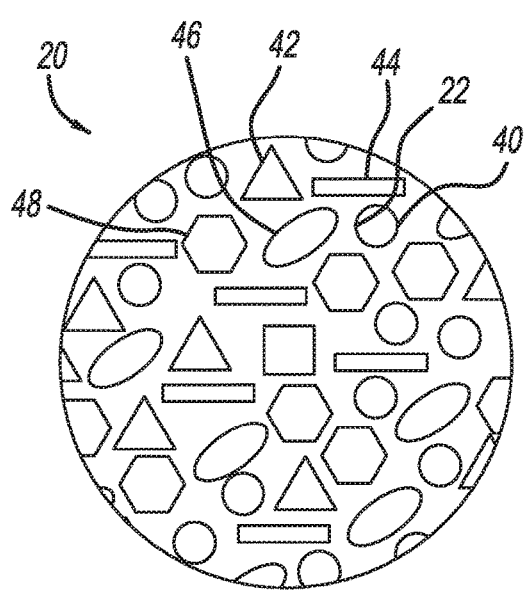
FIG. 4 is a top view of still another emissions control substrate according to the present teachings.

With reference to FIG. 4, the channels 22 may be provided with any suitable cross-sectional shape. For example, the channels 22 may have a generally circular cross-sectional shape 40. Other suitable cross-sectional shapes include triangular 42, rectangular 44, oval 46, hexagonal 48, etc. Each one of the channels 22 may have the same cross-sectional shape along its entire length. Alternatively, a particular channel 22 may have more than one cross-sectional shape along its length. In other words, a single channel 22 may change in cross-sectional shape along its length. Providing channels 22 that have different cross-sectional shapes from one another, and providing channels 22 that vary in cross-sectional shape along lengths thereof, results in numerous advantages. Exemplary advantages include facilitating interaction of exhaust with catalyst(s) present on sidewalls 60 of the channels 22, and/or facilitating flow of exhaust through sidewalls 60 of the channels 22 to filter particulate matter from the exhaust, as described herein.

Figure 5:
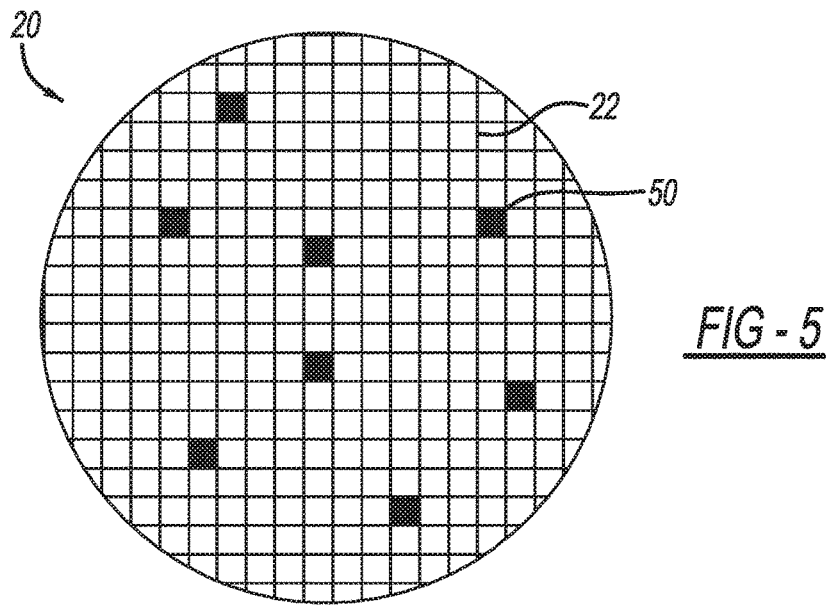
FIG. 5 is a top view of a further emissions control substrate according to the present teachings.

As illustrated in FIG. 5, the substrate 20 can include a plurality of plugs or walls 50 within the channels 22. Each channel 22 can include one or more plugs 50 along the length thereof. The plugs 50 extend generally perpendicular to the direction of exhaust travel through the channels 22 and are impermeable to exhaust. Therefore, each plug 50 blocks the flow of exhaust through the particular channel that the plug 50 is within. The plugs 50 are staggered along the length of the substrate 20 such that channels 22 in close proximity to one another have plugs 50 that are at different points along the length of the substrate 20. As a result, when exhaust flowing through a particular channel 22 contacts a plug 50, or comes within close proximity to a plug 50, the exhaust is forced through the sidewalls of the channel 22 and into a neighboring channel 22. Thus, the plugs 50 advantageously force exhaust to cross over from one channel 22 to another channel 22 through exhaust-permeable sidewalls 60 separating the channels 22. This facilitates flow of exhaust through the sidewalls 60 of the channels 22 to filter particulate matter from the exhaust, such as when the substrate 20 is used as a particulate filter, and/or facilities interaction of exhaust with catalyst(s) present on sidewalls 60 of the channels 22, such as when the substrate 20 is used as catalytic converter.

Figure 6:
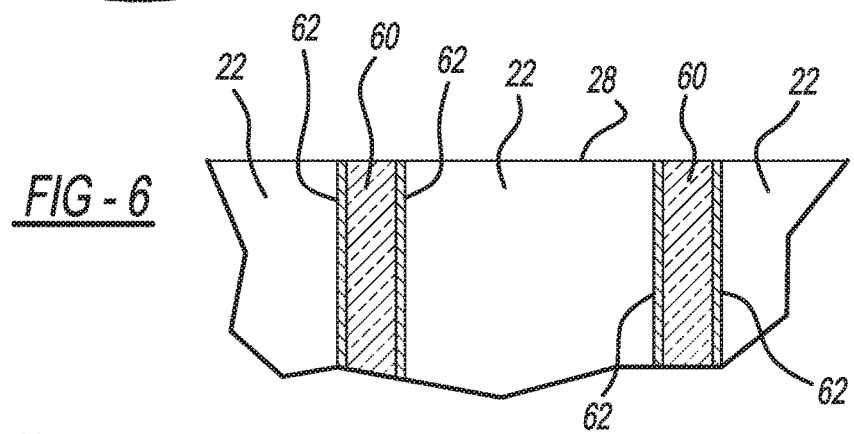
FIG. 6 is a cross-sectional view taken along line 6-6 of FIG. 2.

FIG. 6 is a cross-sectional view of an exemplary one of the channels 22, and partially illustrates neighboring channels 22 on opposite sides thereof. Each channel 22 is defined by sidewalls 60 of the substrate 20. The sidewalls 60 can be made of any suitable material. For example, when the substrate 20 is configured for use as a particulate matter filter, such as a diesel particulate matter filter, the sidewalls 60 can be made of any material that is suitable to filter (and thus trap therein) particulate matter from exhaust passing through the sidewall 60. The particulate matter filtered can be any atmospheric pollutant including hydrocarbons or other chemicals, such as soot, ash, dust, fumes, smog, etc., for example. The sidewalls 60 can thus include any suitable ceramic material, such as cordierite. The sidewalls 60 can be formed using any suitable three-dimensional printing technique, as described above.

The sidewalls 60 can have an outer metallic layer 62. The outer metallic layer 62 can include any suitable metal, such as any suitable precious metal. When the substrate 20 is used as a catalytic converter, the metallic layer 62 can include any catalyst suitable for catalyzing a redox reaction to treat toxic pollutants in exhaust gas prior to release of the exhaust to the atmosphere. For example, the catalyst can be any catalyst suitable to convert carbon monoxide, hydrocarbons, and nitrogen oxides to carbon dioxide, water vapor, and nitrogen gas, for example. When the substrate 20 is used as a diesel particulate filter, the metallic layer 62 can be any catalyst suitable for regenerating the substrate 20 by reducing the ignition temperature necessary to oxidize particulate matter that has accumulated on or in the sidewalls 60. Exemplary catalysts include, but are not limited to, platinum, palladium, rhodium, cerium, iron, manganese, nickel, and copper.

Figure 7:
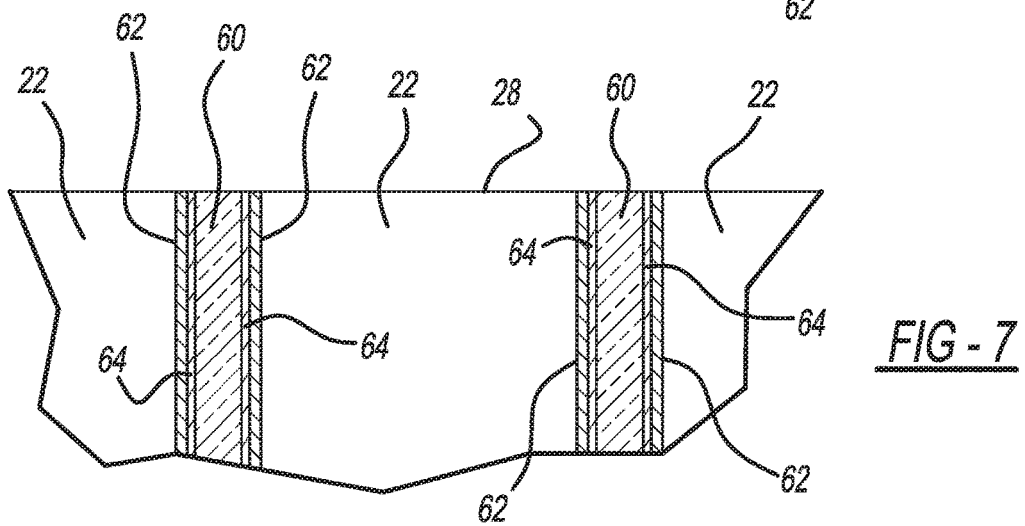
FIG. 7 is a cross-sectional view of an emissions control substrate according to the present teachings including a transition layer between a channel wall and an outer metallic layer.

The metallic layer 62 can be provided on the sidewall 60 in any suitable manner. For example, the metallic layer 62 can be three-dimensionally printed on the sidewall 60 as the sidewall 60 is being printed, or the metallic layer 62 can be printed on the sidewall 60 after the sidewall 60 has been printed or otherwise formed. Metallic layer 62 can be directly printed on the sidewall 60, so as to eliminate any need for an intermediate layer or washcoat for example. Alternatively and as illustrated in FIG. 7, a transition zone or layer 64 can be included between the sidewall 60 and the metallic layer 62. The transition zone 64 can be a carrier for the metallic layer 62, such as a washcoat, and can be made of any suitable material. For example, the transition zone 64 can include a mixture of the ceramic of the sidewall 60 and the metal of the metallic layer 62. As a washcoat, the transition zone 64 can include any suitable material for suspending the metallic layer 62, such as, but not limited to, the following: aluminum oxide; titanium dioxide; silicon dioxide; and a mixture of silica and alumina. The transition zone 64 can be applied to the sidewall 60 in any suitable manner, such as by three-dimensional printing.

Figure 8:
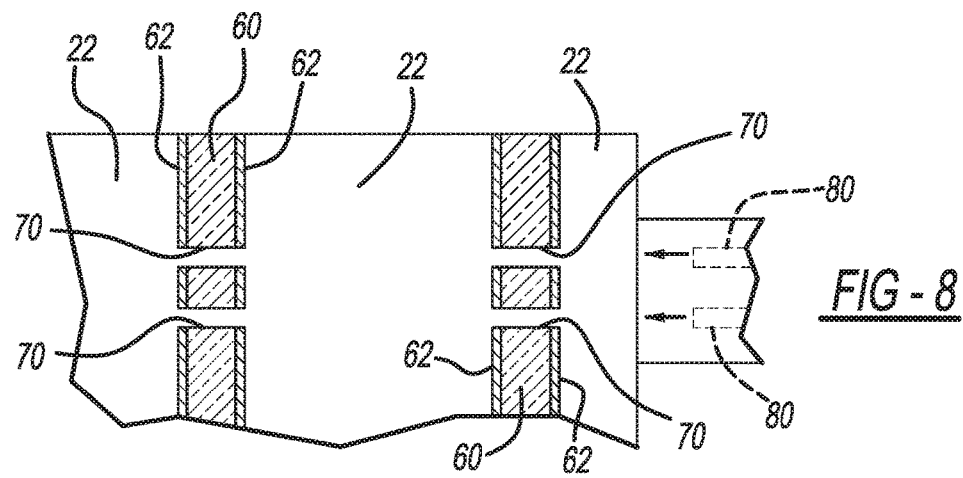
FIG. 8 is a cross-sectional view of an emissions control substrate according to the present teachings including particulate traps between adjacent channels thereof.

With reference to FIG. 8, the sidewalls 60 can define particulate matter traps 70 extending between channels 22, which are configured to trap particulate matter therein as exhaust gas flows through the channels 22 from one channel 22 to a neighboring channel 22. The particulate matter traps 70 can be configured to trap any type of particulate matter, such as soot, ash, dust, fumes, smog, etc., for example. The particulate matter traps 70 extend through the metallic layer 62 (when included), and can extend completely or partially through the sidewall 60. Any suitable number of particulate matter traps 70 can be provided through any suitable number of the channels 22. The particulate matter traps 70 can be formed in any suitable manner. For example, the particulate matter traps 70 can be defined between the sidewalls 60 as the sidewalls 60 are printed, or can be formed within the sidewalls 60 after printing, such as with a laser punch 80 for example.

Figure 9:
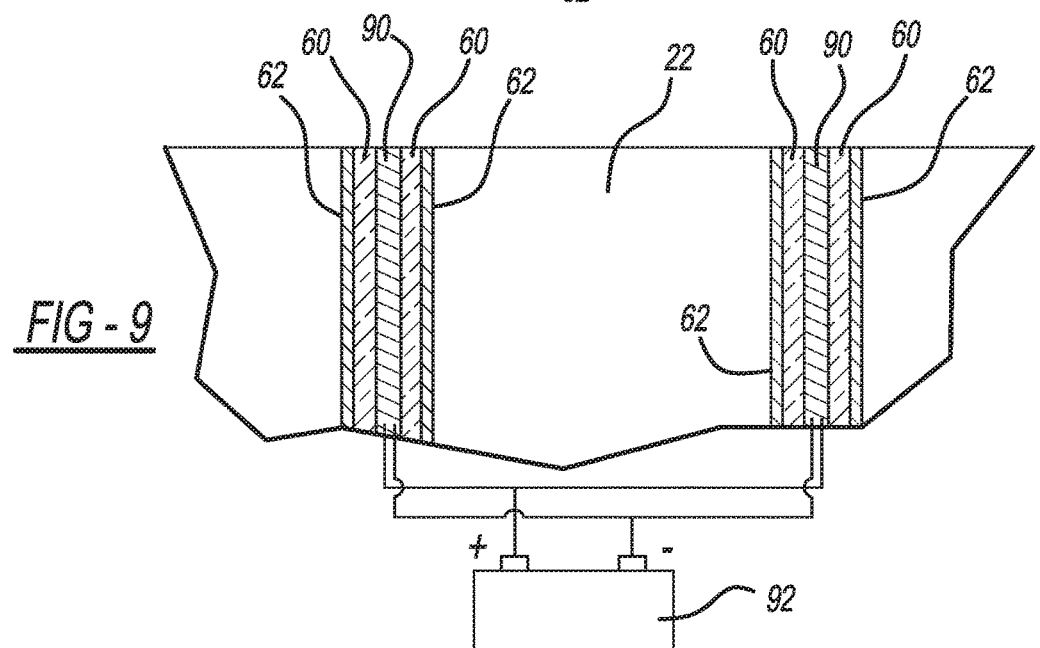
FIG. 9 is a cross-sectional view of an emissions control substrate according to the present teachings including a heating element between channels thereof.

With reference to FIG. 9, the sidewalls 60 can be provided with a heating element 90 therein. As exhaust flows through the sidewall 60, the exhaust will flow around the heating element 90 in order to heat the exhaust. The heating element 90 can be any suitable heating element. For example, the heating element 90 can be an electrode connected to a current source, such as a battery 92. The heating element 90 can be provided within the sidewall 60 in any suitable manner, such as during three-dimensional printing of the sidewall 60. Thus, the sidewall 60 and the heating element 90 can be advantageously printed together. When the substrate 20 is used as a diesel particulate filter, the heating element 90 can be used to facilitate regeneration. For example, raising the temperature of the sidewall 60 to about 600° C. or higher facilitates oxidization of carbon-rich particulate matter, and results in the particulate matter being burned-off in order to clean the substrate 20. Heating the sidewalls 60 can also facilitate the redox reaction when the substrate 20 is used as a catalytic converter, particularly when the engine is started at cold temperatures.

Figure 10:
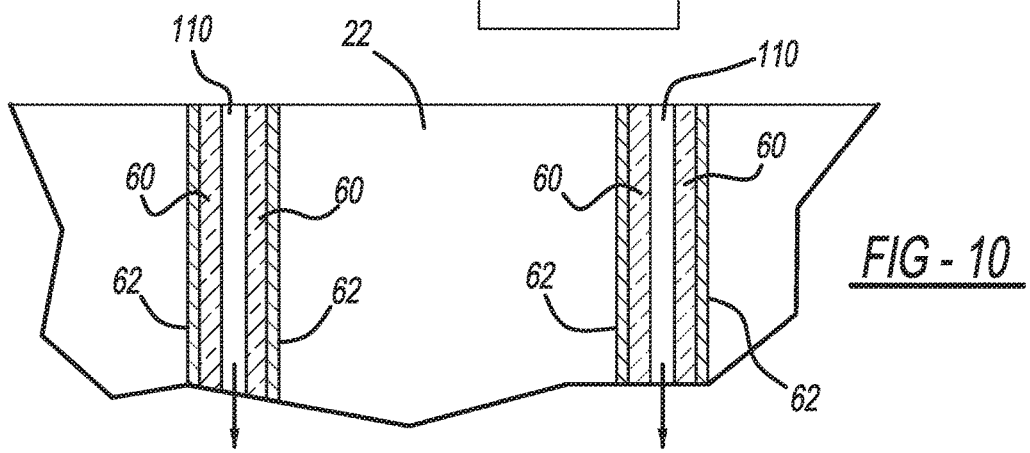
FIG. 10 is a cross-sectional view of an emissions control substrate according to the present teachings defining a fluid flow path between channels of the substrate.

FIG. 10 illustrates a fluid flow path 110 defined within the sidewalls 60. The fluid flow path 110 can be formed within the sidewalls 60 in any suitable manner, such as during three-dimensional printing of the sidewalls 60. The fluid flow path 110 can be formed to flow through any suitable number of the sidewalls 60, and can be configured to permit any suitable fluid to flow therethrough. For example, any suitable liquid that can be warmed, such as warming oil, can be provided within the fluid flow path 110 to facilitate regeneration of the substrate 20 and/or facilitate the redox reaction of a catalytic converter. As exhaust flows through the sidewall 60, the exhaust will flow around the fluid flow path 110 with the warming oil or other suitable warming liquid, in order to heat the exhaust. The fluid flow path 110 can also include any suitable reductant to facilitate the redox reaction in a catalytic converter, such as a urea solution. Contents of the fluid flow path 110 can be added during the three-dimensional printing process forming the sidewall 60, or after the sidewall 60 has been formed by spraying or injecting the liquid into an inlet of the fluid flow path 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An emissions control substrate comprising:
a first end and a second end opposite to the first end;
a plurality of channels extending between the first end and the second end and configured to direct exhaust from an engine through the emissions control substrate; and
fluid flow paths extending through the emissions control substrate, the fluid flow paths defined within sidewalls that define the plurality of channels;
wherein the emissions control substrate is three-dimensionally printed;
wherein the plurality of channels continuously curve along lengths thereof as the plurality of channels extend between the first end and the second end; and
wherein the plurality of channels twist in a clockwise or counterclockwise direction along the lengths thereof from the first end to the second end.

2. The emissions control substrate of claim 1, wherein the emissions control substrate is a catalytic converter.

3. The emissions control substrate of claim 1, wherein the emissions control substrate is a diesel particulate filter.

4. The emissions control substrate of claim 1, wherein the sidewalls are ceramic sidewalls of the emissions control substrate that are permeable to exhaust.

5. The emissions control substrate of claim 1, wherein each one of the plurality of channels defines one or more of the following shapes in cross-section: circular; oval; square; rectangular; triangular; and hexagonal.

6. The emissions control substrate of claim 1, wherein at least some of the plurality of channels include plugs along lengths thereof configured to restrict flow of exhaust through the plugs and force exhaust through the sidewalls of the plurality of channels.

7. The emissions control substrate of claim 1, wherein:
the sidewalls of the plurality of channels include ceramic; and
a metallic layer on the sidewalls includes a metallic catalyst configured to catalyze at least one of diesel particulate filter regeneration and conversion of carbon monoxide, hydrocarbons, and nitrogen oxides to carbon dioxide, water vapor, and nitrogen gas.

8. The emissions control substrate of claim 7, wherein the sidewalls include cordierite, and the metallic catalyst includes a precious metal including at least one of the following: platinum; palladium; rhodium; cerium; iron; manganese; nickel; and copper.

9. The emissions control substrate of claim 1, further comprising a metallic layer directly deposited on the sidewalls of the plurality of channels by three-dimensional printing.

10. The emissions control substrate of claim 1, further comprising a metallic layer on the sidewalls of the plurality of channels and a transition zone therebetween;
wherein the transition zone includes the metallic layer and ceramic of the sidewalls.

11. The emissions control substrate of claim 1, further comprising a heating element embedded within the emissions control substrate.

12. The emissions control substrate of claim 1, wherein the fluid flow paths include a heating solution.

13. The emissions control substrate of claim 12, wherein the heating solution includes warming oil.

14. The emissions control substrate of claim 1, wherein the fluid flow paths include a chemical reductant configured to convert nitrogen oxide to molecular nitrogen and oxygen.

15. The emissions control substrate of claim 14, wherein the chemical reductant includes urea.

16. The emissions control substrate of claim 1, wherein the emissions control substrate is integrated with an outer exhaust chamber by three-dimensional printing.

* * * * *